M. P. HOLMES.
TRUCK.
APPLICATION FILED OCT. 3, 1917.
1,342,407.
Patented June 1, 1920.
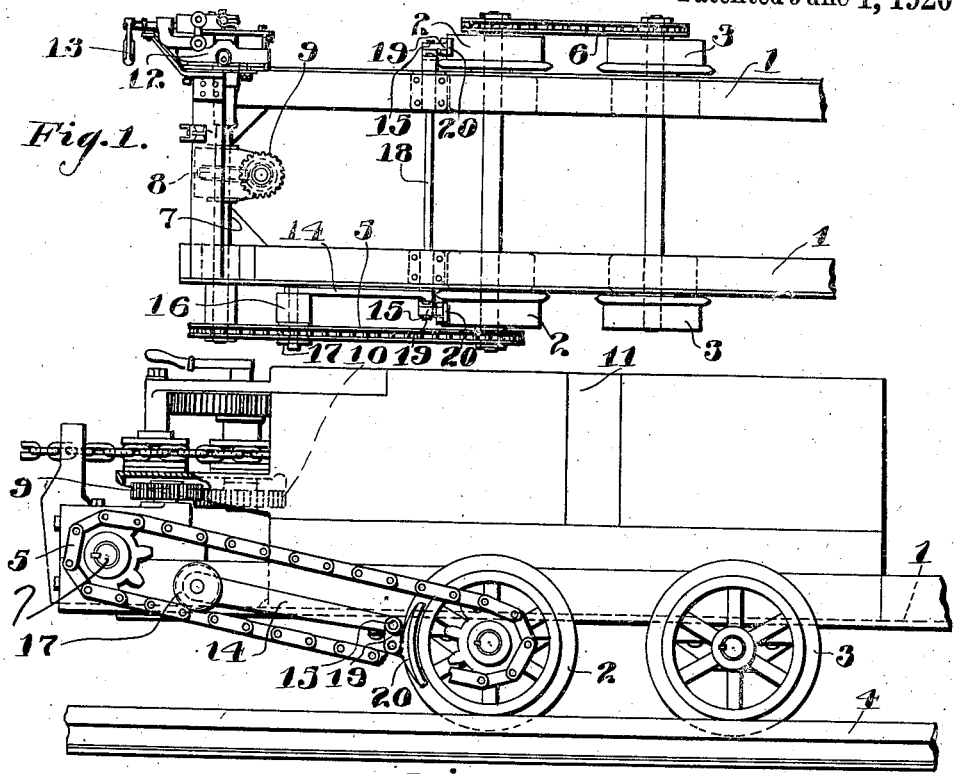
Fig. 1.
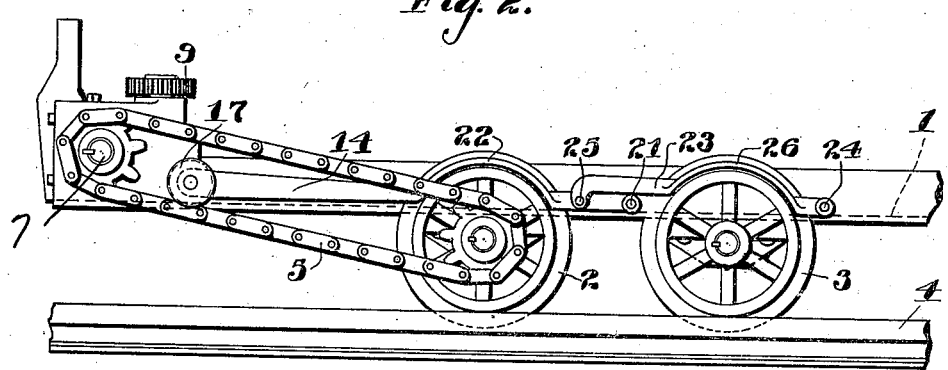
Fig. 2.
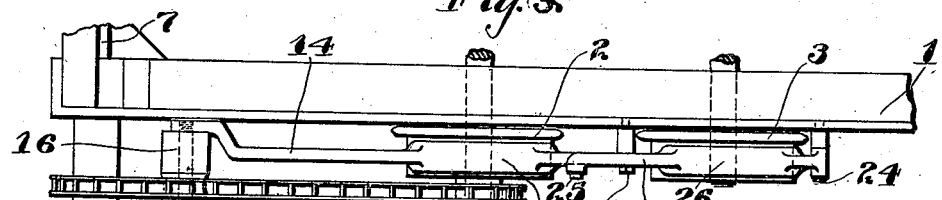
Fig. 3.
Fig. 4.
Inventor:
Morris P. Holmes.
by Horace L. Clark
att'y.

UNITED STATES PATENT OFFICE.

MORRIS P. HOLMES, OF CLAREMONT, NEW HAMPSHIRE, ASSIGNOR TO SULLIVAN MACHINERY COMPANY, A CORPORATION OF MASSACHUSETTS.

TRUCK.

1,342,407. Specification of Letters Patent. Patented June 1, 1920.

Application filed October 3, 1917. Serial No. 194,597.

*To all whom it may concern:*

Be it known that I, MORRIS P. HOLMES, a citizen of the United States, residing at Claremont, in the county of Sullivan and State of New Hampshire, have invented certain new and useful Improvements in Trucks, of which the following is a full, clear, and exact specification.

My invention relates to trucks.

It has for its object to provide an improved braking mechanism for trucks or the like whereby upon the rupture or accidental disconnection of certain of the driving elements of the truck, the brakes are automatically applied. A further object of my invention is to provide an improved braking mechanism especially adapted to use in connection with power driven trucks of the type used with mining machines, the brake-ing mechanism being adapted to act automatically in an emergency to apply the brakes to the truck and thereby arrest movement of the truck and the heavy mining machine carried thereon in such a manner as to prevent accidents which might otherwise occur should such a heavy equipment run wild on the steep grades encountered in many mines. These and other objects and advantages of my improved construction will, however, hereinafter more fully appear.

In the accompanying drawings, I have shown for purposes of illustration two embodiments which my invention may assume in practice, illustrating the same as applied to a mining machine truck of standard form.

In these drawings,—

Figure 1 is a plan view of a truck equipped with one form of my improvement.

Fig. 2 is a side elevation of the truck shown in Fig. 1, with a mining machine thereon.

Fig. 3 is a side elevation of a truck equipped with a modified form of the invention shown in Figs. 1 and 2.

Fig. 4 is a plan view of a portion of the truck shown in Fig. 3.

In this illustrative construction, it will be noted that I have shown a mining machine truck of usual form including a frame having thereon the usual machine guiding surfaces 1 and mounted on front and rear faces 2 and 3 adapted to engage with the track 4 and operatively connected, as shown, through suitable driving connections 5 and 6, herein shown in the form of flexible chain and sprocket connections, with a power shaft 7 preferably disposed at the rear of the truck. As shown, this shaft 7 is operatively connectible with the mining machine through suitable gearing 8, itself connected to a gear 9 which is in turn engageable with a suitable gear, as for instance the gear indicated at 10, forming one of the moving parts of a motor driven mining machine 11 of well known construction. Thus, as in the usual construction, when the motor of the mining machine 11 is operated to rotate the gear 10, the rotation of the latter will be imparted through the gear 9 to the shaft 7, and the rotation of the latter will be thus imparted to the wheels 2 and 3 to propel the truck. It will also be noted that I have herein shown brake and clutch mechanism 12 operatively disposed at one end of the shaft 7 and controlled by a single lever 13, the same being adapted to use in the control of the truck in a well known manner, and not being specifically described, as the construction of this mechanism is old and well known.

In my improvement, it will be observed that I have provided at one side of the truck and inside the chain connection 5, a rearwardly disposed member 14 pivotally mounted at its front end at 15 on the truck at a point in rear of the wheels 2, and having a rear weighted portion 16, preferably also provided with a roller 17, which is in turn adapted to rest upon the lower run of the chain connection 5. It will also be noted that this member 14 is fixed to a cross shaft 18 suitably journaled in the frame, and that this shaft is also fixed at its opposite ends to short, vertically disposed members or cranks 19, in turn pivotally connected to brake shoes 20 engageable with the rear surface of the wheels 2. Thus, it will be observed that when the driving connection between the shaft 7 and the wheels 2 becomes disconnected, as for instance when the chain 5 becomes detached, the weight of the member 14 will cause the same to drop down about its pivot 15 and thus rock the shaft 18 and swing the cranks 19 to the right in such a manner as to bring the brake shoes 20 into frictional engagement with the wheels 2 and thus automatically arrest movement of the truck when the hand controlled braking mechanism 12 controlled by the lever 13 is inoperative.

In the form of my invention shown in Figs. 3 and 4, it will be noted that the member 14 is pivoted at 21 at a point between the wheels 2 and 3, and elongated, and itself provided with an intermediate arcuate or brake shoe portion 22 adapted to engage the upper portion of the wheel 2, the separate brake shoe 20 being thus rendered unnecessary. It will also be noted that in this construction a supplemental member 23 is provided, which is pivotally connected to the frame at 24 at a point in front of the wheel 3 and is pivotally connected at 25 to the member 14 at a point to the rear of its pivot 21, this member 22 likewise being provided with an arcuate or brake shoe portion 26 adapted to engage the upper surface of the wheel 3. Due to this construction, it will be observed that when the member 14 is permitted to drop down, as for instance when the chain 5 is broken or becomes detached for any reason, the weight of the member 14 will cause the portion 22 thereof to engage the wheel 2 frictionally and, at the same time, will cause the rear end of the member 23 to be depressed in such a manner as to bring the portion 26 thereof into frictional engagement with the wheel 3.

In the use of my improvement, it will be observed that no matter when the driving connection 5 may break, the wheels 2 and 3 are automatically retarded, the automatic braking mechanism acting instantaneously to apply the brakes either to the two rear wheels, as shown in the construction illustrated in Figs. 1 and 2, or to the two wheels at one side of the truck, as in the construction illustrated in Figs. 3 and 4, the effect being such that regardless of the grade on which the truck may be moved, all danger of the truck and its heavy machine running wild in the mine is effectively prevented. It will also be observed that the construction shown is exceedingly simple in form and adapted to be applied without difficulty to a truck of standard construction, and that during the normal operation of the same, the mechanism in no way interferes with the ordinary driving mechanism, the latter being, as usual, controlled through the clutch and brake mechanism 12 which is in turn controlled through the controlling lever 13. These and other advantages of my improved construction will, however, be clearly apparent to those skilled in the art.

While I have in this application specifically described two embodiments which my invention may assume in practice, it will be understood that these forms of the same are shown for purposes of illustration and that the same may be modified and embodied in various other forms without departing from the spirit of the invention, it being my intention to include all such modifications within the scope of the appended claims.

What I claim as new and desire to secure by Letters Patent is:

1. In a truck, truck driving mechanism, and a retarding means pivotally mounted on a part of said truck and partially supported by said mechanism, automatically operative upon disconnection of said driving mechanism to retard truck movement.

2. In a truck, truck driving mechanism, and weight controlled retarding means held in an inoperative position by said mechanism and automatically operative upon disconnection of said driving mechanism to retard truck movement.

3. In a truck, truck driving mechanism, and normally inoperative means including a pivoted operating lever normally held in an inoperative position by a part of said mechanism and automatically operative upon disconnection of said driving mechanism to retard truck movement.

4. In combination, a wheeled truck, a mining machine thereon, driving connections between said mining machine and the truck wheels, and braking mecanism pivotally mounted on a part of said truck and held in an inoperative position by a part of said driving connections and automatically operative upon rupture of said driving connections.

5. In combination, a wheeled truck, a mining machine thereon, driving connections between said mining machine and the truck wheels including a flexible element, and braking mechanism pivotally mounted on a part of said truck and held in an inoperative position by a part of said driving connections and automatically operative upon rupture of said flexible element.

6. In a truck, truck driving mechanism, controlling mechanism therefor, and automatically acting retarding means mounted partially on the truck and partially on the driving mechanism and independent of said controlling means for automatically retarding truck movement upon disconnection of said driving mechanism.

7. In a truck, truck driving mechanism, controlling mechanism therefor, and automatically acting normally inoperative means responsive solely to gravity and independent of said controlling means for automatically retarding truck movement upon disconnection of said driving mechanism.

8. In a truck, truck driving mechanism, controlling mechanism therefor, and automatically acting normally inoperative means normally engaging said driving mechanism and independent of said controlling means for automatically retarding truck movement upon disconnection of said driving mechanism.

9. In combination, a wheeled truck, a mining machine thereon, driving connections between said mining machine and the truck wheels, means for controlling the movement of said truck, and supplemental automatically acting means including a weighted lever partially supported by the truck driving mechanism for retarding movement of the truck upon disconnection of said driving mechanism.

10. In a truck, truck driving mechanism, and normally inoperative means including a pivoted operating lever and operative connections between the same and the truck wheels automatically operative upon disconnection of said driving mechanism to retard truck movement.

11. In a truck, truck driving mechanism including a flexible driving connection, a pivoted member engageable therewith and normally resting thereon, and braking mechanism operatively connected to said member and automatically actuated thereby upon rupture of said driving connection.

12. In a truck, truck driving mechanism including a flexible driving connection, a pivoted member engageable therewith and normally resting thereon, and braking mechanism operatively connected between said member and a plurality of the truck wheels and automatically actuated by said member upon rupture of said driving connection.

13. In a truck, truck driving mechanism including a driving connection, a lever pivoted on said truck and having a weighted free end, a roller carried on said lever and normally resting on one of the runs of said connections, and a brake disposed at the opposite end of said lever and engageable with a truck wheel upon rupture of said connection.

14. In a truck, truck driving mechanism including a driving connection, a pivoted member engageable therewith and normally resting thereon, and braking mechanism operatively connected to said member and automatically actuated thereby upon rupture of said driving connection, said braking mechanism including a crank and a pivotally connected braking member engageable with a truck wheel.

15. In a truck, truck driving mechanism, and a plurality of connected braking elements pivotally mounted on said truck and normally held inoperative by the driving mechanism.

16. In a truck, truck driving mechanism, a plurality of connected braking elements pivotally mounted on said truck and normally held inoperative by the driving mechanism, and a single weight attached to one of said elements and tending to render the elements operative.

17. In a truck, truck driving mechanism including a flexible driving connection, a plurality of braking levers pivotally mounted on said truck, one of said levers having a free end, a roller on said free end and normally resting on the flexible connection, and brakes disposed on said levers and engageable with truck wheels upon rupture of said connection.

18. In a truck, truck driving mechanism including a flexible driving connection, a plurality of braking levers pivotally mounted on said truck, one of said levers having a weighted free end, a roller on said free end and normally resting on the flexible connection, and brakes disposed on said levers and engageable with truck wheels upon rupture of said connection.

19. In a truck, truck driving mechanism, a braking lever pivotally mounted on said truck and engaging said mechanism, and a second braking lever pivotally mounted on the truck and operatively connected with the first lever.

20. In a truck, truck driving mechanism, a weighted braking lever pivotally mounted on said truck and engaging said mechanism, and a second braking lever pivotally mounted on the truck and operatively connected with the first lever.

21. In a truck, truck driving mechanism, a braking lever pivotally mounted on said truck and engaging said mechanism, and a second braking lever pivotally mounted on the truck and operatively connected with the first lever, said braking levers being automatically operative to retard the motion of the truck upon disconnection of said driving mechanism.

22. In a truck, a driving wheel, transmission mechanism connected thereto, and retarding mechanism controlled by said transmission mechanism and automatically operated upon disconnection of the latter to retard truck movement.

23. In a truck, a driving wheel, transmission mechanism connected thereto, and a braking element mounted on said truck and normally held inoperative by the transmission mechanism.

24. In a truck, a driving wheel, transmission mechanism connected thereto, and retarding means normally held in inoperative position by said mechanism and automatically operative upon disconnection of said mechanism to retard truck movement.

25. In a truck, a driving wheel, transmission mechanism connected thereto, and a plurality of connected braking elements pivotally mounted on said truck and normally held inoperative by the transmission mechanism.

26. In combination, a truck, a mining machine thereon, truck driving transmission mechanism on said truck driven by said mining machine, and braking means automatically operative to retard the truck upon a break in said transmission mechanism.

27. In combination, a truck, a mining machine thereon, truck driving transmission mechanism on said truck driven by said mining machine whereby the latter may drive the former, and a brake for the truck normally held out of operation by the transmission mechanism.

28. In combination, a truck, a mining machine thereon, truck driving mechanism driven by said machine including a chain, and braking means automatically operative to retard the truck upon breakage of said chain.

In testimony whereof I affix my signature.

MORRIS P. HOLMES.